Dec. 26, 1950     W. M. ANDERSON     2,535,253
SIDEWALK AND FLOOR SCRAPER
Filed Feb. 17, 1948
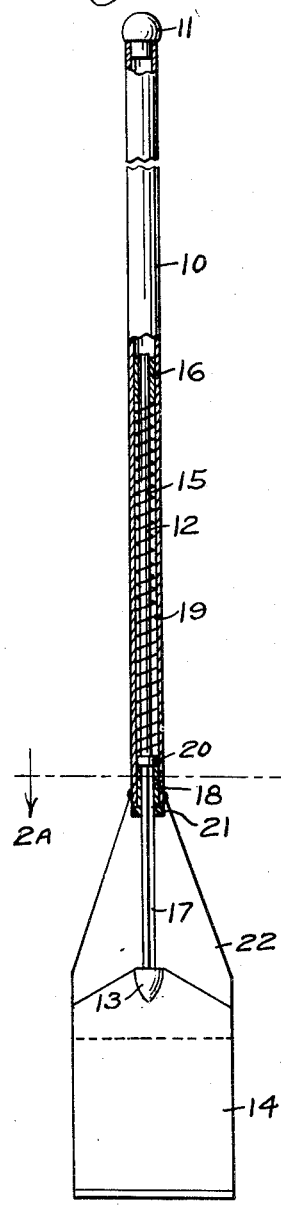
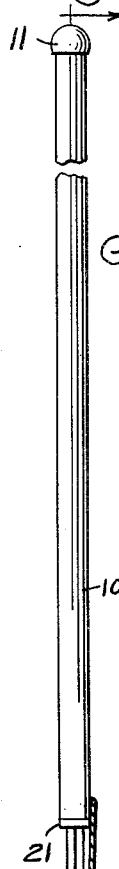
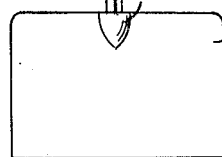
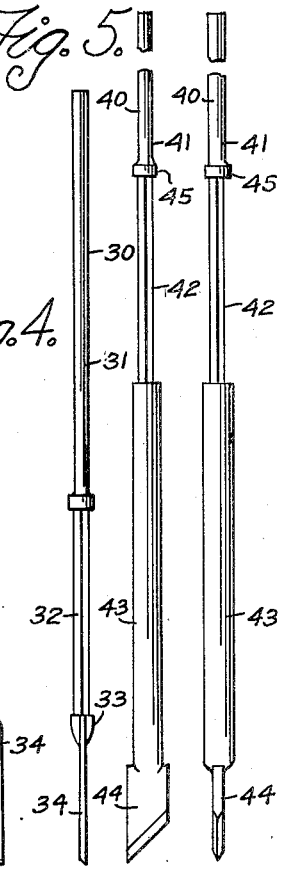
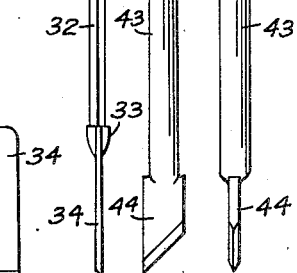
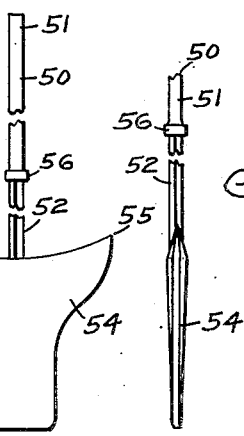
INVENTOR.
William M. Anderson
BY Victor J. Evans & Co.
ATTORNEYS Patented Dec. 26, 1950

2,535,253

UNITED STATES PATENT OFFICE 2,535,253

SIDEWALK AND FLOOR SCRAPER

William M. Anderson, Virginia, Minn.

Application February 17, 1948, Serial No. 8,933

1 Claim. (Cl. 30—128)

This invention relates to a sidewalk and floor scraper which is of the impact type, having a handle which, by hammer action, will force the scraper over the sidewalk or floor to be scraped.

An object of the invention is to provide a cleaner on the handle which will clean the scraper as the handle is moved up and down, to give impetus to the scraper to drive it forward.

Another object of the invention is to provide an impact handle of a character that can be used with other types of blades or cutters, as well as with a scraper blade.

With the above and other objects and advantages in view, the invention consists of the novel details of construction, arrangement and combination of parts more fully hereinafter described, claimed and illustrated in the accompanying drawing in which:

Figure 1 is a side, elevational view of a scraper embodying the invention, with the cleaning blade thereon shown in section;

Figure 2 is an elevational view, partly in section and taken approximately on the line 2—2 of Figure 1;

Figure 2A is a sectional view on the line 2A—2A of Figure 2;

Figure 3 is a front elevational view of a scraper with the cleaning plate removed;

Figure 4 is a side elevational view of Figure 3;

Figure 5 is a front, elevational view, partly broken away, of an ice chisel with the handle removed;

Figure 6 is a side elevational view of Figure 5;

Figure 7 is a front, elevational view of an iceman's axe with the handle removed;

Figure 8 is a side elevational view of Figure 7.

Referring more in detail to the drawing, the scraper embodying the invention, is shown as comprising a tubular handle 10, having a rubber cushioning knob 11 carried in the upper end thereof. Telescopically mounted in the handle 10, is the rod or shank 12 which, at its outer end, is received in a seat 13 on the scraper or cutting blade 14.

The shank 12 is provided with a circular portion 15 which is slidably mounted in the guide bushing 16 fixed in the handle 10 adjacent the upper end of the shank 12. The shank, at its lower end, has a square portion 17, which is slidably mounted in the guide bushing 18 at the lower end of the handle 10.

A coil spring 19 is sleeved on the portion 15 of the shank 12, engaging at its upper end, the bushing 16, and at its lower end, the collar 20 fixed to the shank 12 at the upper end of the portion 17.

The bushing 18 is provided with a circular flange 21 outwardly of the handle 10, at the lower end thereof, and of the same diameter as the handle. Fixed to the handle 10, slightly above the flange 21, is a cleaning blade 22, which has sliding engagement with the scraper blade 14, as shown in Figure 1.

In use, the scraper blade 14 is placed in position so that the blade is at an angle of approximately 45 degrees to the horizontal plane of the sidewalk or floor.

By moving the handle downward on the shank 12 until the flange 21 engages the seat 13, the scraper blade 14 is moved forward according to the impetus imparted to the handle 10 and the resulting force or impact transmitted to the seat 13 by the flange 21.

The spring 19 will hold the scraper blade 14 in contact with the sidewalk or floor, while the handle is being moved up and down. During the movement of the handle, the cleaner blade 22, which is fixed to the handle, will slide over the cutting blade 14. This sliding contact will keep the cutting blade clean and also clean from the cutting blade any substance that might adhere to the scraper blade 14.

The shape of the portion 17 and the complementary shape of the bushing 18 will prevent twisting of the scraper blade 14 during the operation of the handle. Thus the scraper blade can be controlled by the operation at any desired angle, since the shank 12 cannot swivel during the operation.

The cleaning blade operating with the handle makes it possible to clean and scrape simultaneously.

In Figures 3 and 4, the shank 30 is similar to the shank 12, having the circular portion 31, and the square shaped portion 32 fixed in the seat 33 of the scraper blade 34. The collar 35 is fixed to or made a part of the shaft 30 at the upper end of the portion 32, as is the collar 20 of the previous form described.

The operation of this form of the invention is similar to the form previously described, except that this type of blade is more suitable for snow removal, and the cleaning blade may or may not be used, as desired.

In Figures 5 and 6, an ice chisel is shown, having the shank 40 comprising the circular portion 41, and the square shaped portion 42, which is fixed in the tubular portion 43, on the lower end of which is provided, the chisel blade 44. The collar 45 is fixed to or formed integral with, the shank 40 at the upper end of the portion 42, as are the forms previously described.

In Figures 7 and 8, an iceman's axe is shown having the shank 50 comprising the circular portion 51, and square shaped portion 52, which is fixed to the center of the concave shaped upper edge 53 of the axe blade 54. The curvature of the upper edge 53 forms the pointed prongs or hooks 55, by which the ice, after it is cut, can be easily handled. The shank is, as in the other forms, provided with the collar 56.

The latter two forms of the invention are primarily impact tools for cutting and handling ice, and their operation is similar to the other forms in their operation.

While several forms of blades have been illustrated, as adaptable for use with the structure described, the essence of the invention resides in the handle construction, and the manner of operation possible with such a construction.

It is believed that, from the foregoing description, the manner of construction and operation of the invention will be apparent to those skilled in the art, and it is to be understood that minor changes in the combination, construction and arrangement of parts may be resorted to, provided they fall within the spirit of the invention and the scope of the appended claim.

Having thus described the invention, what is claimed as new and desired to be secured by Letters Patent is:

An impact cutting tool of the character described, comprising a tubular handle, a shank telescopically arranged with said handle, the upper end of the shank being circular in cross-section and the lower end of the shank being square in cross-section, upper and lower guide bushings in said handle for slidably mounting the shank in said handle, the upper bushing conforming to the shape of the circular portion of the shank, and the lower body conforming to the square-shaped portion of the shank, a collar on said shank intermediate said square-shaped portion and said circular portion, a spring on the circular portion of said shank engaging the upper bushing at its upper end and the collar on the shank at its lower end, a flange on the lower bushing forming an impact imparting member, a blade on the lower end of the shank, said blade having an impact receiving seat formed thereon to be engaged by said impact imparting member, whereby movement of the handle on said shank will cause the blade to be forced forwardly of the handle in proportion to the impact imparted to said handle, and a cleaning block is joined to said handle and is adapted for sliding engagement with the blade on the end of the shank during the movement of the handle.

WILLIAM M. ANDERSON.

REFERENCES CITED

The following references are of record in the file of this patent:

UNITED STATES PATENTS

| Number | Name | Date |
|---|---|---|
| 358,665 | Holden | Mar. 1, 1887 |
| 816,536 | Currier | Mar. 27, 1906 |
| 1,628,782 | Janosko | May 17, 1927 |
| 1,645,656 | Miller | Oct. 18, 1927 |